(12) United States Patent
Ziegenbein et al.

(10) Patent No.: US 8,439,062 B1
(45) Date of Patent: May 14, 2013

(54) FLOOD PREVENTING SYSTEM, AND METHOD OF USE

(76) Inventors: Keith J. Ziegenbein, Ashland, NE (US); Zachary J. Ziegenbein, Gretna, NE (US); Zebadiah W. Ziegenbein, Ashland, NE (US)

( * ) Notice: Subject to any disclaimer, the term of this patent is extended or adjusted under 35 U.S.C. 154(b) by 581 days.

(21) Appl. No.: 12/660,512

(22) Filed: Mar. 1, 2010

Related U.S. Application Data

(60) Provisional application No. 61/274,664, filed on Aug. 20, 2009, provisional application No. 61/277,357, filed on Sep. 24, 2009.

(51) Int. Cl.
*F17D 5/02* (2006.01)

(52) U.S. Cl.
USPC ....... 137/15.11; 137/62; 137/312; 137/487.5; 137/558; 73/865.9; 239/69; 122/507

(58) Field of Classification Search ................. 73/865.8, 73/865.9; 239/69; 122/504, 507; 137/312, 137/15.11, 171, 189, 191, 59, 62, 558, 487.5
See application file for complete search history.

(56) References Cited

U.S. PATENT DOCUMENTS

| | | | | |
|---|---|---|---|---|
| 5,113,892 A * | 5/1992 | Hull et al. | ........................ | 137/62 |
| 5,377,529 A | 1/1995 | Boyd | ................................ | 73/40 |
| 6,025,788 A | 2/2000 | Diduck | ..................... | 340/870.16 |
| 6,186,162 B1 * | 2/2001 | Purvis et al. | ................... | 137/312 |
| 6,812,848 B2 | 11/2004 | Candela | .......................... | 340/605 |
| 7,225,056 B2 * | 5/2007 | Bolduan et al. | ............... | 700/282 |
| 7,253,741 B2 * | 8/2007 | Fiorletta et al. | ............... | 340/605 |
| 7,403,839 B1 | 7/2008 | Kaplan | ........................... | 700/282 |
| 7,549,435 B2 | 6/2009 | Walter | ........................ | 137/15.11 |
| 2002/0033759 A1 | 3/2002 | Morello | | |
| 2003/0066340 A1 | 4/2003 | Hassenflug | | |
| 2004/0007264 A1 * | 1/2004 | Bootka | ........................ | 137/312 |
| 2006/0122736 A1 * | 6/2006 | Alexanian | ..................... | 700/284 |
| 2006/0191323 A1 | 8/2006 | Garabedian et al. | | |
| 2007/0181186 A1 * | 8/2007 | Walter | .......................... | 137/312 |
| 2007/0289635 A1 * | 12/2007 | Ghazarian et al. | ............. | 137/312 |
| 2009/0207031 A1 * | 8/2009 | Barth et al. | .................... | 340/605 |

\* cited by examiner

*Primary Examiner* — Eric Keasel
*Assistant Examiner* — Jessica Cahill
(74) *Attorney, Agent, or Firm* — James D. Welch

(57) ABSTRACT

A system and method for detecting water in locations in homes and buildings where it should not be present, and responding by terminating water inlet access to plumbing in said home or building or the like and optionally operating a dump valve, in combination with an approach to periodically testing system operability and providing a signal upon a component performing a predetermined number of operations. The method can further include the monitoring of signals and responding with maintenance and/or replacement.

36 Claims, 3 Drawing Sheets

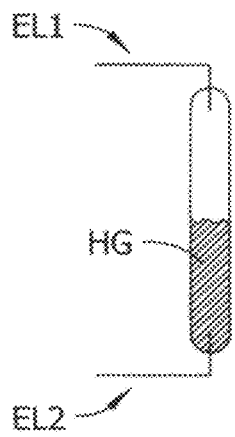
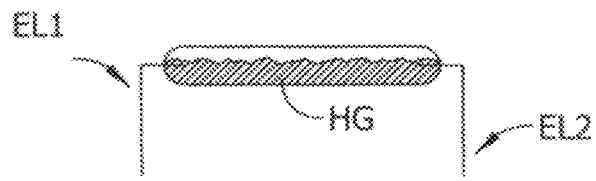
FIG. 7a     FIG. 7b
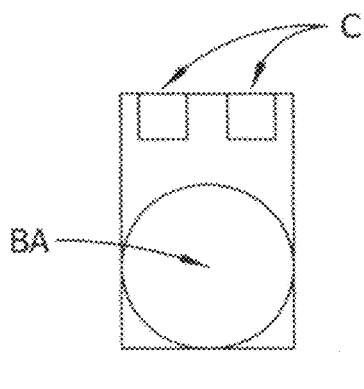
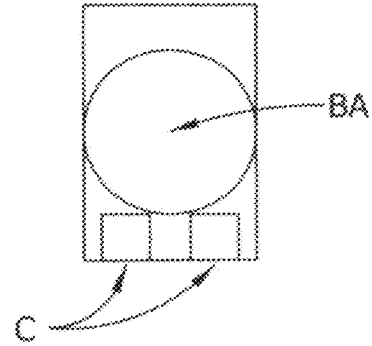
FIG. 7c     FIG. 7d
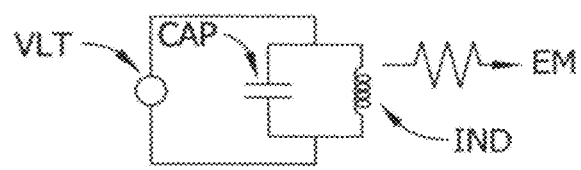
FIG. 8

FLOOD PREVENTING SYSTEM, AND METHOD OF USE

CROSS-REFERENCE TO OTHER APPLICATIONS

This Application Claims Benefit of Provisional Applications 61/274,664 Filed Aug. 20, 2009, and 61/277,357 Filed Sep. 24, 2009.

TECHNICAL FIELD

The present invention relates to prevention of water damage in homes and building or the like resulting from leaks in, or bursts in plumbing and appliances or the like. More particularly the present invention is a system and method for detecting water in locations in homes and buildings where it should not be present, and responding by terminating water inlet access to plumbing in said home or building or the like including freeze valve dumping capability, in combination with an approach to periodically testing system operability and providing service in response to alarms as well as monitoring the number of times a valve or actuator operates and providing a signal upon the reaching a predetermined number, as well as a method of monitoring the signal and responding with maintenance or replacement.

BACKGROUND

It is known that water can cause extensive damage in homes or buildings or the like when the integrity of a water system therein is compromised. Anyone who has ever experienced loss resulting from leaks or burst pipes or malfunctioning appliances etc. is acutely aware of the problem.

It is also known to provide valves and/or actuators for use in controlling fluid flow at local and remote locations.

A Patent to Purvis et al., U.S. Pat. No. 6,186,162 discusses the problem and provides one approach to protecting against water damage by applying a water shut off ball valve adapted to a 90 degree open to shut rotation, and which is caused to operate by receipt of electrical pulses received thereby from a transmitter when a pair of adjacently located electrodes detect the presence of water therebetween.

Additional known Patents are:

U.S. Pat. No. 7,549,435 to Walter which describes systems and methods for correcting a leak;

U.S. Pat. No. 7,403,839 to Kaplan which describes a water shut-off system;

U.S. Pat. No. 6,812,848 to Candele describes a water leak mitigation system;

U.S. Pat. No. 6,025,788 to Diduck describes a liquid and/or gas leak detection and automatic shut-off system;

U.S. Pat. No. 5,377,529 to Boyd describes a leak detection device and methods of constructing and utilizing same.

An application, US2009/0207031 published Aug. 20, 2009 by Barth et al., describes a water leak detection and surveillance system and method.

Another application, US 2006/0191323 published Aug. 31, 2006 by Garabedian et al., describes an automated system for detection of gas an water leaks etc.

Yet another application, US 2003/0066340 published Apr. 10, 2003 by Hassenflug describes a fluid detection and automatic shut off valve.

And another application, US 2002/0033759 by Morello describes a system and method for water leak detection and suppression.

Even in view of the prior art, need remains for improved systems and method of their application which are directed to prevention of water damage in homes and buildings or the like, and for valves and actuators with the capability of providing notice to those in charge of maintaining the valves and actuators when maintenance or replacement should be accomplished.

DISCLOSURE OF THE INVENTION

The present invention is a flood abating system for application in an enclosed space comprising:
 apparatus for receiving water from an external source;
 a water flow control valve comprising apparatus for automatically operating said water flow control valve and apparatus for receiving electromagnetic signals for actuating said automatic operation;
 a freeze dump valve comprising apparatus for automatically operating said freeze dump valve and apparatus for receiving electromagnetic signals for actuating said automatic operation; and
 plumbing inside said enclosed area into which water flowing through said water flow control and freeze dump valves flows into.

Said system further comprises, in said enclosed space:
 sensor apparatus for monitoring temperature inside said enclosed space and providing signals to each of the water flow control and freeze dump valves when ambient temperature inside the enclosed space decreases below a selected temperature;

such that in use during normal operation water is caused to flow from said external source, through said water flow control and freeze dump valves into said plumbing in said enclosed space. When the ambient temperature in said enclosed space decreases below said selected temperature, said apparatus for providing signals to each of the water flow control and freeze dump valves when ambient temperature inside the enclosed space decreases below a selected temperature causes an electromagnetic signal to be transmitted. Upon receipt of which transmitted signal said water flow control valve operates to prevent water flow and said freeze dump valve opens to release pressure in said plumbing inside said enclosed area, preferably vented outside thereof.

Said system can further comprise a plurality of water sensors located at a plurality of locations inside said enclosed space, each thereof having associated therewith apparatus for transmitting electromagnetic signals, each said water sensor being of a substantially two sided two dimensional area having a much smaller third depth dimension, there being at least two electrical contacts on each two dimensional area side thereof, each said water sensor further comprising tilt detection alarm means which sound when its two dimensional area is not oriented substantially horizontally.

In use if at least one water sensor detects the presence of water leaking from said plumbing system it transmits an electromagnetic signal which is received by said water flow control valve apparatus for receiving electromagnetic signals and said apparatus for automatically operating said water flow control valve is in turn caused to operate, such that water flow into the plumbing inside said enclosed area is prevented. Said system can further comprise battery backup for powering at least one selection from the group of:
 operation of said water flow control valve;
 operation of said freeze dump valve;
 operation of said temperature and water sensors; and electromagnetic signal transmitting and receiving means associated with said temperature and water sensors and said water flow control and freeze dump valves respectively;

said battery backup for said at least one selection having associated therewith apparatus for detecting low battery voltage which is less than a selected value, and producing an alarm when said battery voltage reaches said low battery voltage.

A method of assuring operability of a flood abating system for application in an enclosed space comprises:

a) providing a flood abating system as described above, but in addition further comprises:

means, (eg. ultrasonic), for detecting water flow status into said plumbing in said enclosed area; and/or apparatus for keeping count of operation and resetting cycles of said water flow control and/or freeze dump valves and apparatus for transmitting an alarm signal when the number of cycles of at least one of the water flow control and freeze dump valves reaches a selected number.

Where apparatus for keeping count is implemented, the method can provide that a counter be incorporated into valves and actuators such that when the counter reaches a specified count a warning can be sent over wire or by a wireless technique and a light can be caused to light indicating that a valve and/or actuator that has reached the number of predetermined operations. In some cases the valve and actuator can even be, at least on a temporary basis, disabled. This operation will serve to reduce the problem of unexpected valve failure in the field.

Said method can further comprise the steps of:

b) at predetermined times applying said apparatus for detecting water flow status into said plumbing in said enclosed area, and if said flow is below some selected rate, causing said water control and/or freeze dump valves to cycle through operation and resetting; and c) applying said apparatus for keeping count of operation and resetting cycles of said water flow control and/or freeze dump valves to count the number of operations thereof which have occurred, and upon reaching a selected number causing an alarm signal to be transmitted.

Said method can further comprise servicing of the water flow control and freeze dump valve upon one thereof reaching a selected number of operations.

Said method can involve said system further comprising apparatus for controlling the water flow control valve operation closing and opening times, and in which the time of closing is set to be faster than the time of opening to diminish water hammer.

Continuing, the present invention can be a system for controlling access of water to a plumbing system in a house, building, boat or the like comprising:

an actuator and valve combination characterized in that operation of the valve controls water flow therethrough from a source of water into said plumbing system, and the actuator controls operation of said valve, said actuator having functionally associated therewith means for receiving electromagnetic signals, (eg. RF, signal over power system, via LAN or internet etc.);

at least one water sensing means distally located from said actuator and valve combination, comprising a communication apparatus for transmitting an electromagnetic signal to the actuator of the actuator and valve combination when said at least one distally located water sensing means sense the presence of water at its location.

Preferably, the system comprises a plurality of distally located water sensing means placed in a plurality of locations distal from said actuator and valve combination. Each thereof comprises a communication apparatus for transmitting an electromagnetic signal to the actuator of the actuator and valve combination when it senses the presence of water at its location to the end that the sensing of water by a distally located water sensing means can cause valve operation.

In use the actuator and valve is located between the source of water and the plumbing system, and the at least one distally located water sensing means is positioned at a location in said house, building, boat or the like at which it is desired to prevent being subjected to the presence of unintended and undesired water. If water is sensed by said at least one distally located water sensing means, an electromagnetic signal is caused to be sent by the at least one water sensing means distally located from said actuator and valve combination means, and received by the apparatus for receiving an electromagnetic signal functionally associated with said actuator to the end that the valve operates and prevents the flow of water therethrough.

The system can also preferably comprises a local water sensing means near or integrated into said actuator and valve combination, such that the presence of water thereat can cause valve operation.

Typically, each present water sensing means further comprises at least one selection for the group consisting of:

an indicator light system; and an audio signal producing system;

said at least one selection serving to identify the operational status of thereof, such as valve open/closed position.

All electrical power requiring elements of the system are typically powered by grid system provided A/C mains during normal operation, and preferably are powered by battery produced voltage as a back-up. In this light, a system can include providing a relay to disconnect the A/C grid power form the house, building or the like if any water sensor senses the presence of water where it is not wanted. Water sensors and the valve actuator are preferably provided low battery indication.

As mentioned, the system water sensing means preferably comprises at least two contacts situated in proximity to one another and have an electric potential applied therebetween such that the presence of water therebetween can cause current to flow from one contact to another. Preferred, but not necessarily, contacts are gold plated to increase sensitivity to water presence. Each present water sensing means comprising at least two contacts situated in proximity to one another which can be mounted in, for instance, a silver dollar sized container which maintains said contacts substantially parallel to an underlying floor and electrical wiring connection means comprises a "lay-flat" mechanism such that in use the contacts have substantially no influence thereupon to become oriented other than substantially parallel to an underlying floor. It is also noted that water sensing contacts in the silver dollar sized container can be double sided such that if it becomes oriented "up-side-down" it will still operate. Typically water sensing contacts said silver dollar sized container will be accessed using a plug. However, it is to be understood that water sensors can be provided in any specific configuration. For instance, it might be more convenient to not use a plug access approach in difficult to access areas, (eg. behind a toilet), as if the plug comes loose it is inconvenient for a user to reconnect it, and worse, it might go undetected.

The system further comprises a control panel that allows a user to manually assume control of the valve, such that said user can conveniently close said valve when desired, such as during a planned period of absence. Said control panel optionally includes apparatus for periodically overriding a user's manual closing of said valve, such that at desired times water is allowed to flow therethrough, such as for the purpose of enabling watering of yards.

It is noted that it is possible that a system can simply provide a manually operated control panel, and that water sensors not used. For, instance, at a remote cabin it might be desired to simply have a control panel at a convenient location therein which a user can easily access and operate when planning a prolonged absence.

It is also noted that the valve can be of a three piece body construction which comprises a clear dome through which visual indicators can be viewed. Said valve construction can allow easy removal for repairs without the need to disconnect pipe union connections. This can be useful where, for instance, seals are to be replaced.

The present invention system preferably includes a "freeze dump" system, comprising a temperature sensor that monitors temperature inside a house, building, boat or the like. Associated therewith is apparatus for communicating with the actuator and valve combination. If temperatures approach freezing therein the temperature sensor causes the apparatus for communicating with the actuator and valve combination to send a signal to the actuator and valve combination which causes the valve to shut water flow from the source into the plumbing, off. In addition, when this feature is included, the system also will comprise a second valve which then is caused to open and dump at least some water already in the plumbing therefrom, typically into a drain or into a designated area or to an outside vent. Eliminating the pressure in the plumbing serves to insure against pipes bursting if remaining water therein freezes, as room for its expansion is then present.

A method of the present invention comprises controlling access of water to a plumbing system in a house, building, boat or the like, comprises:
 a) providing a system as described above;
 b) upon the sensing of water by said local or at least one distally located water sensing means causing an electromagnetic signal to be transmitted to the apparatus for receiving electromagnetic signals functionally associated with said actuator of the actuator and valve combination, to the end that operation of said valve occurs to stop water flow therethrough.

The electromagnetic signal can be transmitted from said at least one distally located water sensing means via a selection from the group consisting of:
 a) through wiring in the house, building, boat or the like; and
 b) wirelessly.

The method can involve providing an alarm, (eg. audio or visual), when a local or distal water sensor senses the presence of water operation thereof occurs, to the end that a user of said system can determine the location of sensed undesired presence of water. The method can also involve providing low battery indication wherein the alarm means which indicates operation of said local or at least one distally located water sensing means, and the indication of a low battery, are perceivably different.

The method can further comprise monitoring and recording a history of valve operation, and if during a predetermined time period it is determined that said valve has not operated to cycle through a closing and opening procedure, then testing said valve by causing it to cycle through a function status determining closing and opening.

The method can involve performing periodic, (eg. monthly), valve testing cycle be carried out. Preferred practice is that said testing cycle is effected only when at least one selection from the group applies:
 significant water is not flowing through said valve; and
 a real time clock indicates it is between about 12 AM and 6 AM.
Said testing preferably includes providing an alarm to be sounded if the testing of said valve by causing it to cycle through a function status determining closing and opening, shows the valve is not acceptably functional. In addition, a sensor of water flow through the valve can be present and serve to prevent valve testing unless water flow rate is less than some predetermined value. A possible approach is enabling this feature is to apply an ultrasonic sensor which senses Doppler effects of water flow.

During testing or normal operation the method can involve times of closing and opening of said valve are related to one another by a selection from the group:
 they are equal in time;
 the time of opening is longer that the time of closing; and
 the time of opening is shorter that the time of closing.
For instance, to prevent "water hammer" valve opening can be caused to be slower than is closing. This can be accomplished by, for example, applying a micro processor/controller to apply voltage in a programmed manner. For instance, power might be applied to the actuator in a sequence of:
 apply power for 100 ms;
 wait for 500 ms;
 apply power for 150 ms;
 wait for 1000 ms;
 apply power for 200 ms;
etc. until the valve is open to the extent desired, (typically fully open). As a non-limiting example, the total open time can be 3 seconds, with closing time being less than 3 seconds. When valve closing is desired, full power can simply be applied to the actuator to effect fast operation. It is noted that where a micro processor/controller is applied, it can be programmed to provide any desired opening/closing voltage application sequence. However, this does not prohibit the cycle times being set to be equal. It is also noted that the preferred approach is that signals which control the actuator are based on time of application and voltage, rather than on a pulsed signal basis.

The method can involve a user assuming override control at a control panel that allows a user to manually assume control of the valve, such that said user can conveniently close said valve when desired, such as during a planned absence, and said user operates said control panel to cause said valve to close. The control panel will typically comprise a programmable timer which enables periodically over-riding a user's manual closing of said valve, such that at desired times water is allowed to flow therethrough, such as for the purpose of enabling watering of a yard. Further, there can be a sensor which detects water flow through the valve, and delays effecting a user's manual override to close the valve until said flow is below a selected value, and possibly after a delay period. This can be valuable where, for instance, a user attempts to manually close a valve when a dishwasher is operating. The described feature will allow the dishwasher cycle to finish its cycle before the user's command is effective. However, even during a manual override, upon the sensing of water by the local or a distally located water sensing means will still cause the apparatus for receiving electromagnetic signals functionally associated with the actuator of said actuator and valve combination to receive an electromagnetic signal and in turn causes operation of said valve to stop water flow therethrough. The described application of a user override control panel is useful when, for instance, a user is away from the home, building, boat or the like for an extended period.

A supplemental method of testing a system for controlling access of water to a plumbing system in a house, building, boat or the like, comprises:

a) providing a system for controlling access of water to a plumbing system in a house, building, boat or the like comprising:
- an actuator and valve combination characterized in that operation of the valve controls water flow therethrough from a source of water into said plumbing system, and the actuator controls operation of said valve, said actuator having functionally associated therewith means for receiving electromagnetic signals;
- a plurality of water sensing means distally located from said actuator and valve combination, comprising a communication apparatus for transmitting an electromagnetic signal to the actuator of the actuator and valve combination when said at least one distally located water sensing means senses the presence of water at its location, said plurality of one water sensing means each further comprising apparatus for individually detecting the distal location thereof.

In use, the actuator and valve is located between the source of water and the plumbing system, and the plurality of distally located water sensing means are positioned at locations in said house, building, boat or the like at which it is desired to prevent being subjected to the presence of unintended and undesired water. If water is sensed by a distally located water sensing means, an electromagnetic signal is caused to be sent thereby to said apparatus for receiving electromagnetic signals functionally associated with said actuator of the actuator and valve combination means, to the end that the valve operates and prevents the flow of water therethrough.

Said method continues with:

b) periodically causing operation of at least one of said means for individually detecting the location thereof to operate, and, using it as a guide to enable identifying the location thereof, physically approaching, accessing and physically and concretely testing the operability of the associated water sensing means, by a process that simulates the unwanted presence of water at its location and noting the response of said system for controlling access of water to a plumbing system in a house, building, boat or the like; and c) using the results of said testing to direct the repairing or replacing any of said at least one water sensing means which does not pass said testing, said repairing or replacing constituting a concrete and tangible physical change.

Said method can comprise sequentially causing operation of a selection from the group consisting of:
- at least two of said apparatus for individually detecting the location thereof to operate; and
- all of said plurality of apparatus for individually detecting the location thereof to operate; and using the results of said testing to direct physical concrete repairing or replacing each of said tested plurality of water sensing means which do not pass said testing, said repairing or replacing constituting a concrete and tangible physical change.

Said method can further comprise entering the results of said testing of the operability of said at least one of said plurality of water sensing means into machine readable storage and accessing said machine readable storage for the purpose of analyzing the contents thereof and presenting at least some results thereof in a concrete and tangible media.

Said method can involve machine readable storage being located distally from said system for controlling access of water to a plumbing system in said house, building, boat or the like, and the results of testing of the operability of each of said at means by an electromagnetic signal, (eg. via internet or the like, over wire or wirelessly etc.).

The method of use can involve the valve manufacturer providing maintenance of and/or replacement of valves, and could involve the manufacturer providing a monitoring service. The end result will be to provide users uninterrupted device service and peace of mind as regards unexpected valve failures.

Finally, the present invention is premised on being used in an "enclosed space". However, it is within the scope of the present invention that it could be applied in an "open space". Therefore, while the preferred embodiment involves use in an enclosed space, the word "enclosed" is to be interpreted broadly to include a space "enclosed" by atmosphere. Further, while the sensor contacts were described as "gold plated", said language is to be interpreted to include solid gold contacts.

The invention will be better understood by reference to the Detailed Description Section of this Specification, in combination with the Drawings.

BRIEF DESCRIPTION OF THE DRAWINGS

FIGS. 7a and 7b demonstrate an orientation detection means in the form of a mercury (Hg) switch, which when in the FIG. 7a orientation does not conduct electricity between electrodes (EL1) and (EL2), but in FIG. 7b does conduct between said electrodes (EL1) and (EL2).

FIGS. 7c and 7d show an alternative orientation detection means in the form of a dual contact (C) system in functional combination with a ball in a tube.

FIG. 8 is included to show a source of electromagnetic radiation (EM) can be a circuit comprising a capacitor (CAP) and inductor (IND) supplied by a variable voltage (V).

DETAILED DESCRIPTION

Figure 1:
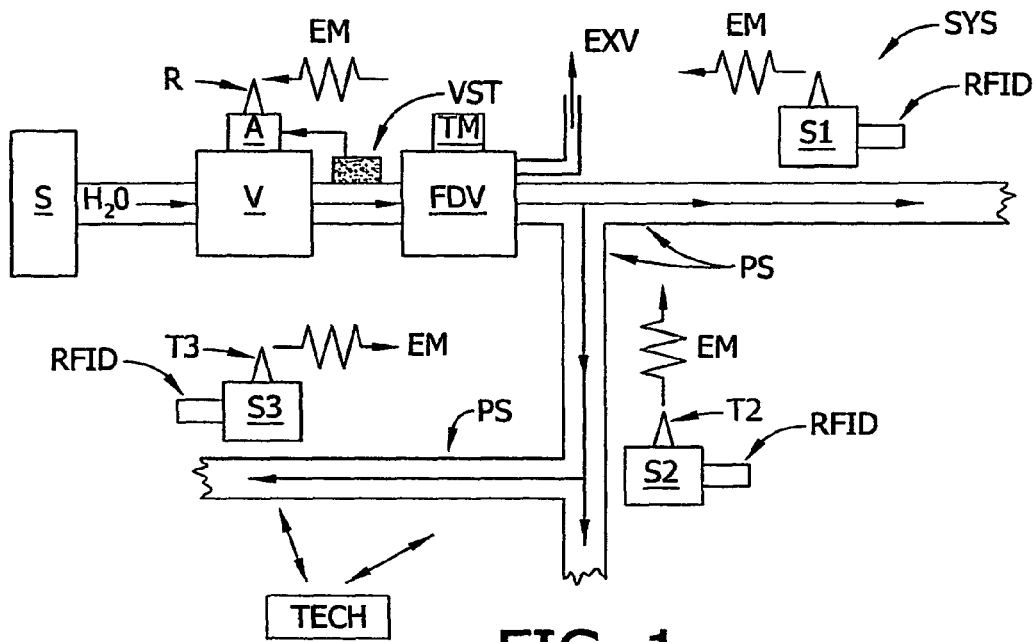
FIG. 1 shows a demonstrative present invention system (SYS).

Turning now to the Drawings, FIG. 1 there is shown a demonstrative system (SYS) for controlling access of water to a plumbing system (PS) in a house, building, boat or the like comprising:

an actuator and valve (A) (V) combination characterized in that operation of the valve (V) controls water (H2O) flow therethrough from a source (S) of water into said plumbing system (PS), and the actuator controls operation of said valve (V), said actuator (A) having functionally associated therewith apparatus for receiving (R) electromagnetic signals (EM), (eg. RF, signal over power system etc.);

a freeze-dump valve (FDV) and temperature sensor (TM), and also a vent (EXV) for use in externally discharging water outside a house, building, boat etc.;

at least one water sensing means (S1) (S2) (S3) distally located from said actuator and valve (A) (V) combination, comprising a communication apparatus for transmitting (T1) (T2) (T3) an electromagnetic signal (EM) to the actuator (A) of the actuator and valve (A) (V) combination when said at least one distally located water sensing means (S1) (S2) S3) sense the presence of water at its location.

(Note: the sensors (S1) (S2) (S3) are shown located near plumbing system (PS) pipes, as they will normally be, but it is to be understood that sensors can be located anywhere in a house, building, boat or the like where the presence of unintended water would be undesirable. Also, it is to be considered that electrical power is provided to each sensor (S1) (S2) (S3) from the grid and/or from battery where desired).

As described above, upon the sensing of water by a sensor (S1) (S2) (S3) an electromagnetic signal (EM) is caused to be transmitted to the apparatus for receiving (R) electromagnetic signals (EM) functionally associated with said actuator (A) of the actuator and valve (A) (V) combination, to the end that operation of said valve (V) occurs to stop water (H2O) flow therethrough. And as also described above, said electromagnetic signal can be transmitted from said at least one distally located water sensing means through wiring in the house, building, boat or the like or over the air wirelessly. FIG. 1 is to be interpreted to indicate any workable approach.

It is also to be understood that if the temperature sensor (TM) detects a below freezing temperature it will send a signal to the freeze-dump valve (FDV), which in turn opens to release pressure in the plumbing system (PS), (eg. vented to outside (EXV). If this happens, it is combined with providing a signal to the actuator valve (A) (V) so that water flow from the source (S) of water into said plumbing system (PS) is stopped.

Note also the presence of apparatus for locating the sensors (S1) (S2) S3), labeled (RFID). In practice periodic testing of sensors is desirable to assure their operability. However, it can occur that a testing technician (TECH) might not be the same technician that installed the sensors, and therefore might not be aware of their locations in a house, building or boat or the like. Providing a location identifying means allows said testing technician to interrogate the system and in return receive signals transmitted from the (RFID) transmitters, thereby allowing him or her to seek out all sensors for testing.

FIG. 1 further shows a water flow sensor (VST) to sense water flow through said valve (V). This can be an ultrasonic flow rate sensor (UST) provides a signal to said actuator and valve (A)(V) combination, and operation of the valve (V) is blocked when said flow rate is above a designated level, but operation of said valve (V) when said flow rate decreases below said designated rate is allowed. Of course, this is overridden if a water sensor (S1) (S2) (S3) indicates unintended water is present at a location in the house, building, boat or the like.

Figure 2A:
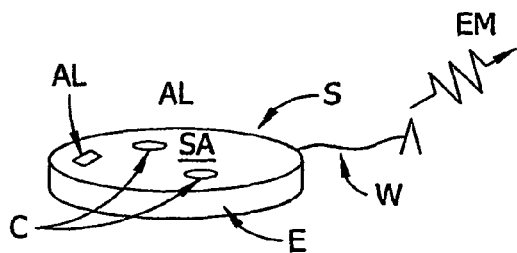
FIGS. 2a and 2b show a demonstrative sensor (S) connected by a wire (W) to the apparatus for transmitting (T) electromagnetic signals (EM).
Figure 2B:
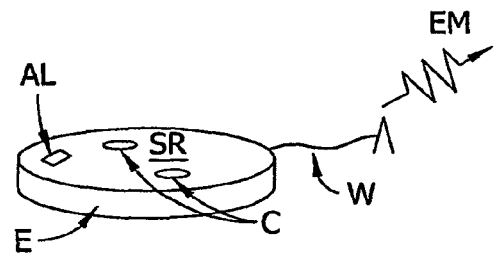

FIG. 2a shows a demonstrative sensor (S) connected by a wire (W) to the apparatus for transmitting (T) electromagnetic signals (EM). Note that it has a side thereof, (eg. (SA)) facing up. FIG. 2b shows the same sensor (S) with side (SR) facing up. This is to make clear that the contacts (C) can be present on both sides (SA) and (SR) so that no matter how the sensor (S) is oriented it can reliably sense water. Further, the shape of the sensor (S) is such that the likelihood of it being in a stable orientation while sitting on an edge (E) is essentially non-existent. Also, the sensors (S) are somewhat heavy, (eg. 2 ounces), have a flexible electrical interconnect for accessing external wires, and as such are not prone to sitting on an outer edge thereof. An analogy is in order. While flipping a quarter and letting it land on the ground might result in it sitting on its edge, the likelihood of such is simple not great. Likewise, placing a present invention sensor (S) on a surface might result in it sitting on its edge, the likelihood of that is small. And even if it does happen, the present invention sensors (S) comprise an alarm mechanism (AL) for sensing such an orientation, and said alarm will then sound if a sensor does become improperly oriented, which will lead to corrective action being taken. FIGS. 2a and 2b demonstrate sensor means.

Figure 2C:
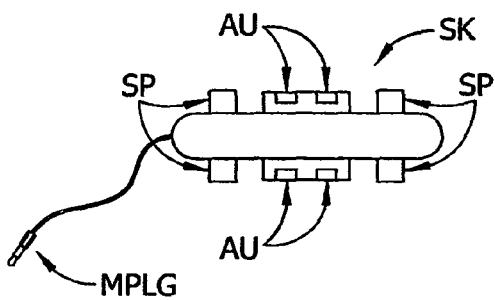
FIGS. 2c and 2d show an alternative sensor (SK) in combination with a base unit (BU) to which it is connected via a lay flat connector.
Figure 2D:
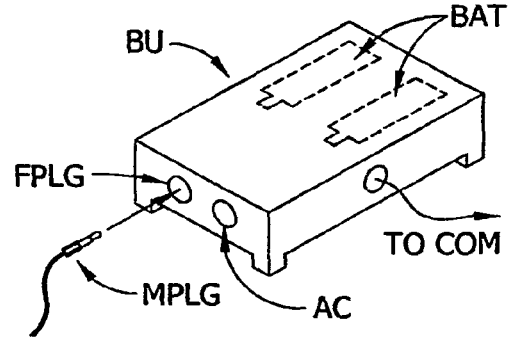

FIG. 2c shows an alternative sensor (SK) which is used in combination with a FIG. 2d base unit (BU), to which it is connected via a lay flat connector (MPLG). Note the alternative sensor (SK) comprises gold plated contacts (AU) on both sides of a substantially flat system, which has spacers (SP) present for supporting the alternative sensor (SK) on a surface. Note FIG. 2d shows the base unit (BU) can be operated by batteries (BAT), or by AC via the shown adapter. Note also the base unit (BU) has a socket (FPLG) into which the lay flat connector (MPLG) plugs in use, and the curved sides, which prevent non-flat orientation.

Figure 3:
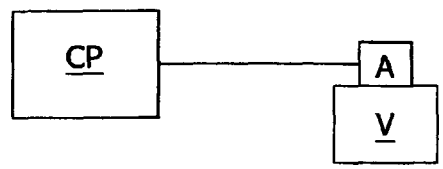
FIG. 3 shows a control panel (CP) which can be used to manually override the system (SYS) by directly causing actuator (A) operation.

FIG. 3 shows a control panel (CP) which can be used to manually override the system (SYS) by directly causing actuator (A) operation.

Figure 4:
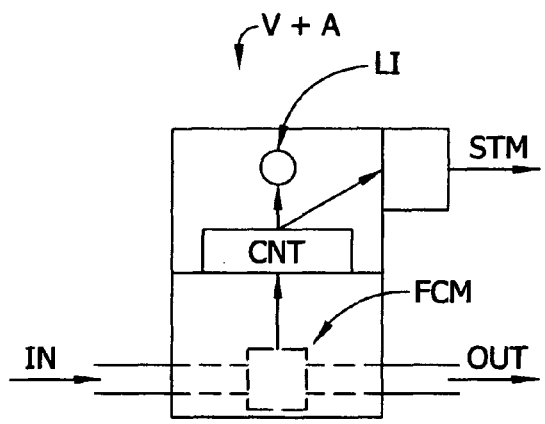
FIG. 4 generally shows an actuator (A) Valve (V) combination, a fluid flow control means (FCM) modified to include a Counter (CNT), a Light Indicator (I), and a Signal Transmission Means (STM).

FIG. 4 generally shows a valve (V) comprising a fluid flow control means (FCM), said valve (V) also comprising a counter (CNT), a light indicator (LI), and a signal transmission means (STM). The counter (CNT) counts each time the flow control means (FCM) operates, and upon reaching a predetermined number sends at least one signal, for instance, via operation of the light indicator (LI) and/or signal transmission means (STM).

Figure 5:
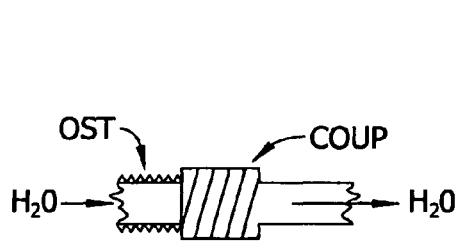
FIG. 5 is provided to demonstrate that apparatus for receiving water from an external source (S) can be a coupler (COUP) with, or without, optional screw threads (OST). A coupler (COUP) can comprise a soldered or welded system.

FIG. 5 is provided to demonstrate that apparatus for receiving water from an external source (S) can be a coupler (COUP) with, or without, optional screw threads (OST). A coupler (COUP) can comprise a soldered or welded system.

Figure 6:
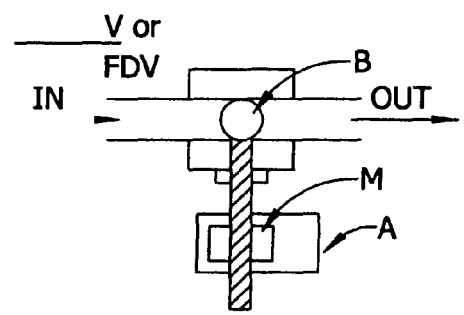
FIG. 6 is included to show that a water flow control valve (V) can comprise apparatus for automatically operating said water flow control valve, (eg. a motor (M)), and apparatus for receiving electromagnetic signals for actuating, (eg. an actuator (A)), said automatic operation.

FIG. 6 is included to show that a water flow control valve (V) can comprise apparatus for automatically operating said water flow control valve, (eg. a motor (M)), and apparatus for receiving electromagnetic signals for actuating, (eg. an actuator (A)), said automatic operation.

FIGS. 7a and 7b demonstrate an orientation detection means in the form of a mercury (Hg) switch, which when in the FIG. 7a orientation does not conduct electricity between electrodes (EL1) and (EL2), but in FIG. 7b does conduct between said electrodes (EL1) and (EL2).

FIGS. 7c and 7d show an alternative orientation detection means in the form of a dual contact (C) system in functional combination with a ball (BA) in an enclosure. When oriented as in FIG. 7c the contacts (C) are not connected together, but when oriented as in FIG. 7d, the ball (BA) provides an electrical pathway threebetween.

FIG. 8 is included to show a source of electromagnetic radiation (EM) can be a circuit comprising a capacitor (CAP) and inductor (IND) supplied by a variable voltage (VLT).

For clarity, it is noted that the terminology "Valve" is to be interpreted broadly for the purposes of the present invention. In general, a "valve" must include apparatus for controlling fluid flow therethrough, but can comprise any number of additional means.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. A system for controlling access of water to a plumbing system in a house, building or boat comprising:
   an actuator and valve combination characterized in that operation of the valve controls water flow therethrough from a source of water into said plumbing system, and the actuator controls operation of said valve, said actuator having functionally associated therewith means for receiving electromagnetic signals;
   at least one water sensing means distally located from said actuator and valve combination, comprising a communication apparatus for transmitting an electromagnetic signal to the actuator of the actuator and valve combination when said at least one distally located water sensing means sense the presence of water at its location;
   such that in use the actuator and valve is located between the source of water and the plumbing system, and the at least one distally located water sensing means is positioned at a location in said house, building or boat at which it is desired to prevent being subjected to the presence of unintended and undesired water, such that if water is sensed by said at least one distally located water sensing means, an electromagnetic signal is caused to be sent by the at least one water sensing means distally located from said actuator and valve combination means, and received by the apparatus for receiving an electromagnetic signal functionally associated with said actuator to the end that the valve operates and prevents the flow of water therethrough;
   said system further comprising a water flow sensor to sense water flow through said valve, and wherein said water flow sensor provides a signal to said actuator and valve operation when said flow rate is above a designated level, which signal blocks valve operation, but allows operation of said valve when said flow rate decreases below said designated rate.

2. A system as in claim 1, wherein the at least one water sensing means distally located from said actuator and valve combination communication apparatus for transmitting an electromagnetic signal and/or the apparatus for receiving an electromagnetic signals functionally associated with the actuator and valve means is/are powered by battery produced voltage at least as back-up.

3. A system as in claim 1, wherein said at least one water sensing means distally located from said actuator and valve combination communication apparatus for transmitting an electromagnetic signal and/or the apparatus for receiving an electromagnetic signals functionally associated with the actuator and valve means is/are powered by battery produced voltage having low battery indication.

4. A system as in claim 1, which further comprises a control panel that allows a user to manually assume control of the valve, such that said user can close said valve when desired.

5. A system as in claim 1, which further comprises a freeze-dump temperature sensor and an associated communication apparatus for transmitting an electromagnetic signal to the actuator of the actuator and valve combination when temperature in the house, building or boat approaches freezing, such that the actuator and valve combination is caused to stop water flow into said plumbing.

6. A system as in claim 1, which further comprises a dump valve which is caused to open after the actuator and valve combination is caused to stop water flow into said plumbing, and such that its operation dumps at least some water already in the plumbing therefrom into a drain or into a designated area.

7. A system as in claim 1, which further comprises apparatus for counting valve operations and providing an alarm when a designated number is reached.

8. A system as in claim 1, wherein the valve operation blocking signal from said water flow sensor is provided to a logic circuit which renders it ineffective to block valve operation in the case that a water sensor senses unintended water at a location in said house, building or boat.

9. A system as in claim 8, wherein the step of providing a system for controlling access of water to a plumbing system in a house, building or boat further comprises providing said signal from said water flow sensor to a logic circuit which renders it ineffective to block valve operation in the case that a water sensor senses unintended water at a location in said house, building or boat.

10. A system as in claim 1, which comprises a local water sensing means near separate from or integrated into said actuator and valve combination, such that the presence of water thereat can cause valve operation.

11. A system as in claim 1, which comprises a plurality of distally located water sensing means placed in a plurality of locations distal from said actuator and valve combination, each of which comprises a communication apparatus for transmitting an electromagnetic signal to the actuator of the actuator and valve combination when said at least one distally located water sensing means sense the presence of water at its location to the end that the sensing of water by a distally located water sensing means can cause valve operation.

12. A system as in claim 10 or 11, wherein each present water sensing means further comprises at least one selection for the group consisting of:
   an indicator light system; and
   an audio signal producing system.

13. A system as in claim 10 or 11, wherein each present water sensing means comprises at least two contacts situated in proximity to one another and have an electric potential applied therebetween such that the presence of water therebetween can cause current to flow from one contact to another.

14. A system as in claim 10 or 11, wherein each present water sensing means comprises at least two contacts situated in proximity to one another which are mounted in container which maintains said contacts substantially parallel to an underlying floor.

15. A method of controlling access of water to a plumbing system in a house, building or boat, comprising:
   a) providing a system for controlling access of water to a plumbing system in a house, building or boat comprising:
      an actuator and valve combination characterized in that operation of the valve controls water flow therethrough from a source of water into said plumbing system, and the actuator controls operation of said valve, said actuator having functionally associated therewith means for receiving electromagnetic signals;

at least one water sensing means distally located from said actuator and valve combination, comprising a communication apparatus for transmitting an electromagnetic signal to the actuator of the actuator and valve combination when said at least one distally located water sensing means sense the presence of water at its location;

a local water sensing means comprising apparatus for providing signal to the actuator of the actuator and valve combination when said it senses the presence of water at its location;

such that in use the actuator and valve is located between the source of water and the plumbing system, and the at least one distally located water sensing means is positioned at a location in said house, building or boat at which it is desired to prevent being subjected to the presence of unintended and undesired water, such that if water is sensed by said local or at least one distally located water sensing means or the local water sensing means, an electromagnetic signal is caused to be sent thereby to said apparatus for receiving electromagnetic signals functionally associated with said actuator of the actuator and valve combination means, to the end that the valve operates and prevents the flow of water therethrough;

said system also comprising a water flow sensor to sense water flow through said valve, and wherein said water flow sensor provides a signal to said actuator when said flow rate is above a designated level, which signal blocks valve operation, but allows operation of said valve when said flow rate decreases below said designated rate, and wherein said system further provides that said blocking of said valve operation when said flow rate is above a designated level, is rendered ineffective in the case that a local or distal water sensor senses unintended water at a location in said house, building or boat;

said system further comprising a control panel that allows a user to manually assume control of the valve, such that said user can close said valve when desired; and b) upon the sensing of water by said local or at least one local or distally located water sensing means causing an electromagnetic signal to be transmitted to the apparatus for receiving electromagnetic signals functionally associated with said actuator of the actuator and valve combination, to the end that operation of said valve occurs to stop water flow therethrough.

16. A method as in claim 15, wherein the electromagnetic signal is transmitted from said at least one distally located water sensing means via a selection from the group consisting of:
 a) through wiring in the house, building or boat; and
 b) wirelessly.

17. A method as in claim 15, wherein at least one selection from the group consisting of:
 said at least one distally located water sensing means; and
 said local sensing means located near the actuator and valve combination;
comprises alarm apparatus for providing an alarm characterized by a selection from the group consisting of:
 audio; and
 visual;
when operation thereof occurs, to the end that a user of said system can determine the location of sensed undesired presence of water.

18. A method as in claim 17, wherein the at least one water sensing means locally, or distally, located at or away from said actuator and valve combination is/are powered by battery produced voltage, at least as back-up, and further comprise low battery indication;
 wherein the alarm means which indicates operation of said local or at least one distally located water sensing means, and the indication of a low battery, are perceivably different.

19. A method as in claim 15, in which the system further comprises apparatus for periodically over-riding a user's manual closing of said valve, such that at desired times water is allowed to flow therethrough.

20. A method as in claim 19, in which during the desired times in which water is allowed to flow through said valve, upon the sensing of water by said local or at least one distally located water sensing means causes the apparatus for receiving electromagnetic signals functionally associated with the actuator of said actuator and valve combination to receive an electromagnetic signal and in turn causes operation of said valve to stop water flow therethrough.

21. A method as in claim 15, wherein the step of providing a system for controlling access of water to a plumbing system in a house, building or boat further comprises providing a freeze-dump temperature sensor and an associated communication apparatus for transmitting an electromagnetic signal to the actuator of the actuator and valve combination when temperature in the house, building or boat approaches freezing, such that the accuator-valve combination is caused to stop water flow into said plumbing.

22. A method as in claim 21, wherein the step of providing a system for controlling access of water to a plumbing system in a house, building or boat further comprises providing a dump valve which is caused to open after the actuator and valve combination is caused to stop water flow into said plumbing, and such that its operation dumps at least some water already in the plumbing therefrom, typically into a drain or into a designated area.

23. A method as in claim 15, in which the system further comprises apparatus for monitoring and recording a history of valve operation, and in which, if during a predetermined time period it is determined that said valve has not operated to cycle through a closing and opening procedure, then testing said valve by causing it to cycle through a function status determining closing and opening.

24. A method as in claim 23, in which the predetermined time period is selected to be about one month.

25. A method as in claim 23, in which a valve testing cycle is caused to be carried out, but wherein said testing cycle is effected only when at least one selection from the group:
 significant water is not flowing through said valve; and
 a real time clock indicates it is between about 12 AM and 6 AM; applies.

26. A method as in claim 23 or 25, in which an alarm is sounded if the testing of said valve by causing it to cycle through a function status determining closing and opening, shows the valve is not functional.

27. A method as in claim 23 or 25, in which the times of closing and opening of said valve are related to one another by a selection from the group:
 they are equal in time;
 the time of opening is longer that the time of closing; and
 the time of opening is shorter that the time of closing.

28. A method of testing a system for controlling access of water to a plumbing system in a house, building or boat, comprising:
  a) providing a system for controlling access of water to a plumbing system in a house, building or boat comprising:
    an actuator and valve combination characterized in that operation of the valve controls water flow therethrough from a source of water into said plumbing system, and the actuator controls operation of said valve, said actuator having functionally associated therewith means for receiving electromagnetic signals;
    a plurality of water sensing means distally located from said actuator and valve combination, comprising a communication apparatus for transmitting an electromagnetic signal to the actuator of the actuator and valve combination when said at least one distally located water sensing means senses the presence of water at its location, said plurality of one water sensing means each further comprising apparatus for individually detecting the distal location thereof;
    such that said system provides utility in that, in use, the actuator and valve is located between the source of water and the plumbing system, and the plurality of distally located water sensing means are positioned at locations in said house, building or boat at which it is desired to prevent being subjected to the presence of unintended and undesired water, such that if water is sensed by a distally located water sensing means, an electromagnetic signal is caused to be sent thereby to said apparatus for receiving electromagnetic signals functionally associated with said actuator of the actuator and valve combination means, to the end that the valve operates and prevents the flow of water therethrough;
  b) periodically causing operation of at least one of said apparatus for individually detecting the location thereof to operate, and, using it as a guide to enable identifying the location thereof, physically approaching, accessing and physically testing the operability of the associated water sensing means, by a process that simulates the unwanted presence of water at its location and noting the response of said system for controlling access of water to a plumbing system in a house, building or boat; and
  c) using the results of said testing to direct the repairing or replacing any of said at least one water sensing means which does not pass said testing, said repairing or replacing constituting a tangible physical change.

29. A method as in claim 15 or 28 wherein the step of providing a system for controlling access of water to a plumbing system in a house, building or boat further comprises providing apparatus for counting valve operations and providing an alarm when a designated number is reached, and said method further comprises the step of an alarm occurring when said designated number of operations is, reached.

30. A method as in claim 28, which comprises sequentially causing operation of a selection from the group consisting of:
  at least two of said apparatus for individually detecting the location thereof to operate; and
  all of said plurality of apparatus for individually detecting the location thereof to operate; and
using the results of said testing to direct physically repairing or replacing each of said tested plurality of water sensing means which do not pass said testing, said repairing or replacing constituting a tangible physical change.

31. A method as in claim 30 which further comprises entering the results of said testing of the operability of said at least two of said plurality of water sensing means into machine readable storage.

32. A method as in claim 31, in which the machine readable storage is located distally from said system for controlling access of water to a plumbing system in said house, building or boat, and the results of testing of the operability of each of said at least one water sensing means are sent to said machine readable means by an electromagnetic signal.

33. A method as in claim 28, which further comprises entering the results of said testing of the operability of said at least one of said plurality of water sensing means into machine readable storage.

34. A method as in claim 32 which further comprises accessing said machine readable storage.

35. A method as in claim 34, which further comprises analyzing the contents thereof and presenting at least some results thereof in a tangible media.

36. A method as in claim 34, in which the machine readable storage is located distally from said system for controlling access of water to a plumbing system in said house, building or boat, and the results of testing of the operability of each of said at least two of said plurality of water sensing means are sent to said machine readable means by an electromagnetic signal.

* * * * *